United States Patent
Lincoln

[15] 3,692,244
[45] Sept. 19, 1972

[54] SPRAY NOZZLE FOR GAS SCRUBBERS
[72] Inventor: Roland L. Lincoln, Salvang, Calif.
[73] Assignee: Fuller Company
[22] Filed: Nov. 19, 1970
[21] Appl. No.: 91,089

[52] U.S. Cl. ..................239/419, 239/430, 239/434.5
[51] Int. Cl. ...............................................B05b 7/04
[58] Field of Search......239/398, 419, 552, 429, 430, 239/434.5

[56] References Cited

UNITED STATES PATENTS

| | | |
|---|---|---|
| 2,795,461 | 6/1957 | Durkin.................239/434.5 X |
| 1,748,604 | 2/1930 | Heimburger............239/434.5 |
| 2,769,670 | 11/1956 | Dunn......................239/398 X |
| 2,447,123 | 8/1948 | Jones......................239/430 X |
| 1,751,719 | 3/1930 | Uhri....................239/434.5 X |
| 2,672,190 | 3/1954 | Schumann..............239/419 X |
| 1,592,865 | 7/1926 | Moxley...............239/434.5 X |
| 1,102,751 | 7/1914 | Hicks......................239/430 X |
| 1,519,462 | 12/1924 | Loker.........................239/430 |
| 894,069 | 7/1908 | Schurs....................239/434.5 |
| 3,455,514 | 7/1969 | Fenley.......................239/419 |

*Primary Examiner*—M. Henson Wood, Jr.
*Assistant Examiner*—Edwin D. Grant
*Attorney*—Jack L. Prather and Frank H. Thomson

[57] ABSTRACT

A liquid spray nozzle which includes a pair of concentric tubular members. Liquid to be sprayed is supplied to the outer tubular member and compressed gas is supplied to the inner tubular member. The outer tubular member includes a reducer portion followed by an expander portion. The liquid and gas mix in the reducer portion and the liquid-gas mixture is discharged from the nozzle through the expander portion. The nozzle is particularly designed for use with a gas scrubber and is positioned in the flow path of the gas to be cleaned as it passes from the dirty gas inlet to the clean gas outlet. The liquid spray is countercurrent to the flow of gas to be cleaned.

2 Claims, 4 Drawing Figures

PATENTED SEP 19 1972
3,692,244
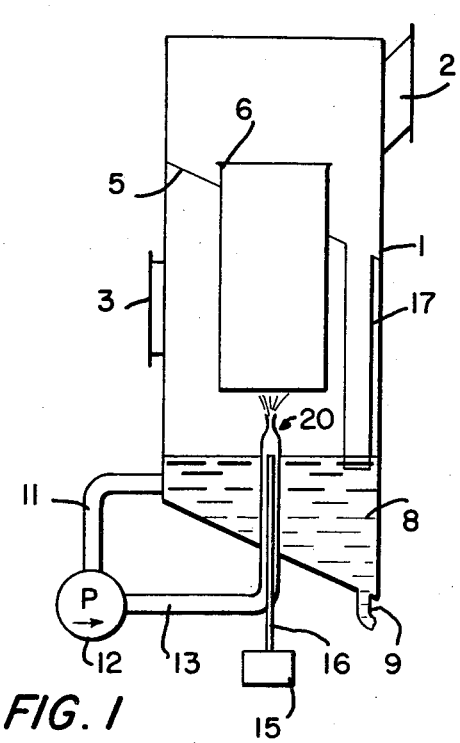
FIG. 1
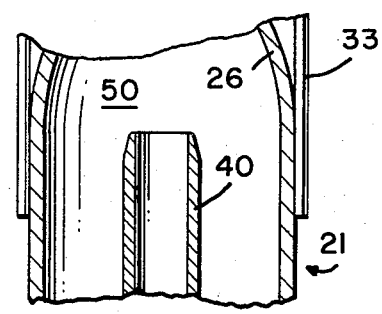
FIG. 3
FIG. 4
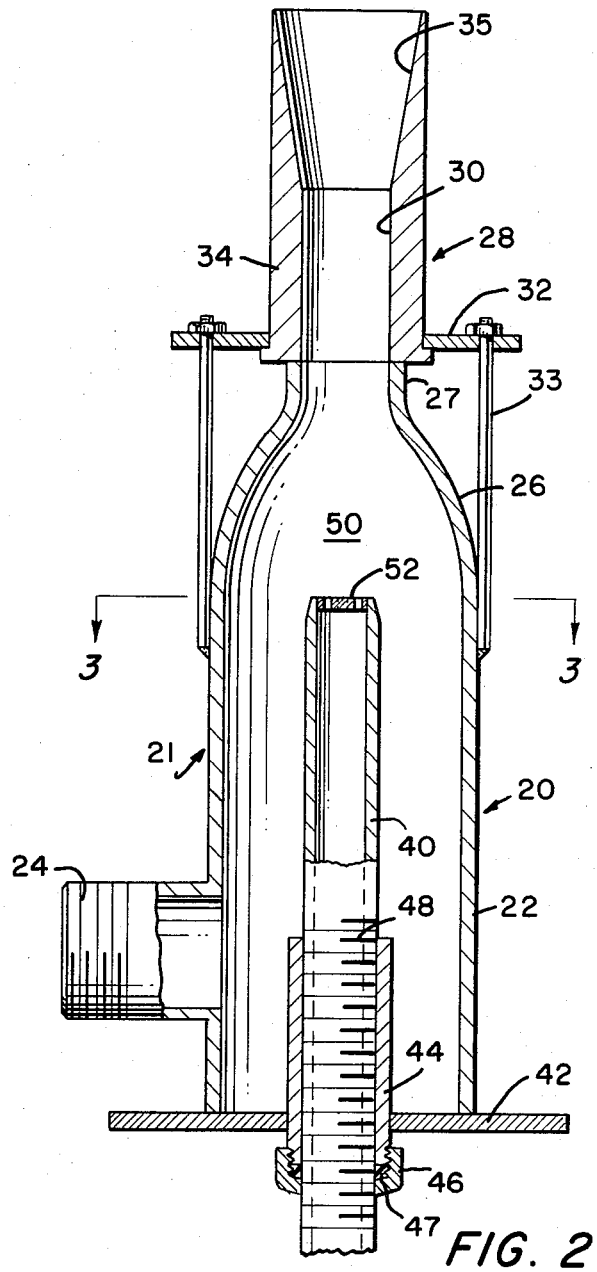
FIG. 2
INVENTOR
ROLAND L. LINCOLN
BY Frank H. Thomson
Jack L. Prather
ATTORNEY

SPRAY NOZZLE FOR GAS SCRUBBERS

BACKGROUND OF THE INVENTION

The present invention relates to liquid spray nozzles and in particular to a liquid spray nozzle designed for use with a gas scrubber. The nozzle is particularly designed for use with the gas scrubber shown in my prior copending U. S. Pat. Application, Ser. No. 30,670, filed Apr. 22, 1970, now U.S. Pat. No. 3,651,620.

Most gas scrubbers presently commercially available are of the Venturi-type in which the dirty gas to be cleaned is accelerated to a high velocity by being passed through a Venturi. Scrubbing water is introduced into the high velocity gas in order to clean the gas. In such scrubbers, the high energy contact between the scrubbing water and the dirty gas is achieved by the acceleration of the dirty gas. Such high energy contact is necessary for efficient collection of the dust particles in the dirty gas. In my prior, copending U. S. Pat. Application, Ser. No. 30,670, filed Apr. 22, 1970, I disclose a novel gas scrubber in which the high energy contact is achieved by putting most of the energy into the water which in introduced into the flow of dirty gas. This is accomplished by using gas such as air at elevated pressure to spray the scrubbing liquid.

In order for the scrubber shown and described in my prior, above mention patent application to properly clean the dirty gas, it is essential that the scrubbing liquid be adequately atomized, have a high velocity in order to achieve high energy contact, have a spray envelop the configuration of which covers the full gas stream and supply a large volume of liquid. By the present invention, I have provided a liquid spray nozzle which satisfactorily performs these functions.

Prior to the present invention, spray nozzles often employed mechanical atomization of the liquid by pumping the liquid through an orifice. With such an arrangement, it is difficult to impart to the water the high energy necessary for the proper operation of the gas scrubber of my aforementioned applications, without the use of either very small orifices which tend to plug or excessive water quantities. An additional problem with such arrangements is that complete atomization and proper spray direction is not always achieved.

Prior spray nozzles which employ gas at an elevated pressure to spray the liquid have been found to be unsatisfactory in achieving proper atomization and spray pattern. An additional problem encountered with prior spray nozzles which employ air at elevated pressure to atomize liquid is that the air must be at pressures of 50 psig and higher which require the use of a multistage compressor. In gas scrubber use, it would be desirable to be able to operate with lower pressures; such as 30 psig to use single stage compressors or 10 to 15 psig which can be achieved with a blower. It would also be desireable to have a nozzle which is capable of operating efficiently with the use of either high or low pressure air.

For many applications of spray nozzles and particularly nozzles for use with wet scrubbers, the water spray must cover a wide area and there must be complete water coverage within the outer periphery of the spray envelope. Many prior spray nozzles provide a large spray envelope, but water is atomized only around the outer periphery of the spray envelope.

Spray nozzles which are to be used with gas scrubbers must be capable of atomizing large quantities of water. The nozzle of the present invention is designed to atomize liquid at flow rates up to 200 gallons per minute and more.

An additional requirement of spray nozzles for many applications is that they must be capable of atomizing liquids which contain particulate matter without becoming plugges. This is particularly important in applications where unfiltered water is to be used.

SUMMARY

It is, therefore, the principal object of this invention to provide a novel liquid spray nozzle which overcomes the disadvantages of prior spray nozzles.

It is another object of this invention to provide a liquid spray nozzle which is capable of atomizing large quantities of liquid.

It is a further object of this invention to provide a liquid spray nozzle which is particularly adapted for use with a gas scrubber wherein most of the energy required for cleaning the gas is imparted to the scrubbing liquid.

It is still a further object of this invention to provide a liquid spray nozzle which is capable of atomizing an unfiltered liquid without becoming plugged.

In general, the foregoing and other objects of this invention will be carried out by providing a nozzle for spraying liquids comprising first tubular means defining a continuous liquid flow passage; said first tubular means having internal walls which define a first longitudinal portion having a substantially constant cross-sectional area; a second longitudinal portion having a substantially continuously decreasing cross-sectional area; and a third longitudinal portion having a substantially continuously increasing cross-sectional area which terminates in an open end; a second tubular means extending into said first tubular means and defining a flow passage for gaseous fluid which terminates in an open end with said first tubular means; means for supplying liquid to be sprayed to said first tubular means; and means for supplying gaseous fluid at elevated pressure to said second tubular means whereby the gaseous fluid mixes with said liquid within said first tubular means and the mixture is discharged from the nozzle through the open end of said third portion.

BRIEF DESCRIPTION OF THE DRAWING

The invention will be described in connection with the annexed drawing wherein:

FIG. 1 is a diagrammatic view of a gas scrubber which employs the nozzle of the present invention;

FIG. 2 is a sectional view of the liquid spray nozzle of the present invention;

FIG. 3 is a fragmentary sectional view on an enlarged scale taken on the line 3—3 of FIG. 2; and FIG. 4 is a fragmentary sectional view of a modification of the present invention.

DESCRIPTION OF THE PREFERRED EMBODIMENTS

The invention will be described as it is used with a gas scrubber, but it is intended that the spray nozzle of the present invention be applicable wherever it is desired to achieve good atomization of a large quantity of liquid. The nozzle of the present invention is particularly applicable for use with the gas scrubber shown and described in my copending U. S. Pat. Application Ser. No. 30,670, filed Apr. 22, 1970.

Referring to FIG. 1, the gas scrubber of the above mentioned copending application is schematically shown. The scrubber includes a housing 1 having a dirty gas inlet 2 and a clean outlet 3. The housing is divided by means of a plate 5 having a column 6 vertically mounted therein. The bottom of the housing 1 provides a liquid reservoir 8 having a drain 9.

The liquid spray nozzle of the present invention is generally indicated at 20 and is adapted to spray liquid up into the column 6. Liquid from the reservoir 8 is circulated through a conduit 11, pump 12 and conduit 13 to the nozzle 20. Gas at an elevated pressure is supplied from a source 15 such as a compressor or a blower through a conduit 16 to the nozzle 20.

In operation, dirty gas enters the housing 1 through inlet 2 and passes through column 6 at a velocity. Liquid is sprayed by nozzle 20 up into the column 6 in a direction counter-current to the flow of dirty gas. Unlike Venturi-type gas scrubbers, the high energy necessary for efficient gas cleaning is imparted to the scrubbing liquid rather than to the flow of dirty gas. The liquid spray cleans the dirty gas in a manner well known in the gas scrubber art. Cleaned gas is exhausted from housing 1 through outlet 3. A conduit 17 is provided in the plate 5 to drain any liquid which reaches the chamber above the plate 5 back into the reservoir 8.

The nozzle of the present invention is best illustrated in FIGS. 2 and 3. The nozzle 20 includes a first tubular means 21 which includes a first longitudinal portion 22 having a substantially constant cross-sectional area. The tubular means 21 has an inlet conduit 24 which is adapted to be connected to a source of liquid to be sprayed such as conduit 13. Downstream of the inlet conduit 24 is a reducer or second longitudinal portion 26 which is shown as a truncated cone having curved sidewalls having a substantially continuously decreasing cross-sectional area. It should be understood, that the reducer 26 may have straight conical walls. The important feature is that the walls defining a substantially, continuously restricting flow passage. The downstream end of the reducer portion 26 is provided with straight sides 27.

A spray director means generally indicated at 28 and having a flow passage 30 therethrough is mounted on the reducer portion 26 in coaxial alignment with the reducer 26 and first longitudinal portion 22. The spray director means is mounted on the first tubular member by means of an annular plate 32 and threaded rods 33 as clearly shown in FIG. 2. The flow passage 30 includes a longitudinal portion 34 having a constant cross-sectional area V and a divergent longitudinal portion 35. The largest diameter of the divergent portion 35 is preferably smaller than the full diameter of the portion 22.

A second tubular means 40 is mounted concentrically within the first tubular means 21. The member 40 is mounted in tubular means 21 by means of a plate 42 which closes tubular means 21, a threaded sleeve 44 and a pipe cap 46 having an O-ring seal 47. The tubular means 40 is threaded as at 48 to permit longitudinal adjustment of the second tubular means 40 within the tubular means 21, The tubular member 40 is adapted to be connected to the conduit 16 and the source of gas at elevated pressure 15. Preferably, the second tubular means terminates at the beginning of the reducer portion 26 so that a mixing chamber 50 is defined within the reducer 26.

For high pressure applications in the compressor range of about 30 psig, member 40 is closed by a plate 52 having a plurality of orifices 54 therethrough. The longitudinal axes of the orifices 54 should be substantially parallel with the longitudinal axis of the second tubular member 20 and the flow passage 30. For low pressure operations, i.e. in the blower range of 10 to 15 psig, the passage in the tubular member 40 may be left open as shown in FIG. 4.

In operation of the nozzle, large quantities of liquid to be sprayed is supplied from the pump 12 through conduit 13 to inlet conduit 24 and the first tubular means 21. The liquid rises in the first tubular portion 22 into the mixing chamber 50. Gas at elevated pressure is supplied from the source 15 through conduit 16 into the second tubular member 40 where it passes through the opening in the end of tubular member 40 into the mixing chamber 50. The mixture is forced through flow passage 30 and out the spray director 28 into the column 6 of the gas scrubber. The spray director and in particular the divergent portion 35 serves to insured a proper spray envelope which is of sufficient width to cover the entire column 6 of the scrubber. The spray envelope is not only wide but also liquid is atomized throughout the full periphery of the envelope. This insures that all dirty gas is contacted with water. The reducer portion 26 serves to aid in the atomization of the liquid.

In some applications, it may be desirable to adjust the relative portion of the outlet of the tubular member 40 within the first tubular means 21. If the outlet is moved upwards from the position shown in FIG. 2, a different spray pattern will be achieved. It is believed that the amount of atomization of the liquid will be altered.

From the foregoing it should be apparent that the objects of the present invention have been carried out. The spray nozzle can be used with either high pressure gas by employing the plate 52 or with low pressure gas by leaving the flow passage in tubular means 40 open. The energy is imparted to the liquid by the use of gas at elevated pressured rather than by a high pressure pump. This is particularly important when dirty water is being used, as dirty water presents problems with high pressure pumps. The spray director 28 insures a proper spray envelope which is particularly important for use in gas scrubber applications. The open flow passage design of the nozzle permits large quantities of unfiltered liquid to be sprayed. This is particularly important with the gas scrubber shown since dirty water is recirculated.

It is intended that the foregoing description be merely that of a preferred embodiment and that the invention be limited solely by that which is within the scope of the appended claims.

I claim:

1. For use in combination with a gas scrubber having an inlet for supplying a gas to be cleaned and an outlet for cleaned gas, a nozzle for spraying scrubbing liquid into the dirty gas in a direction opposite to the flow of gas to be cleaned comprising:
   a first tubular member;
   means for supplying scrubbing liquid to said first tubular member;
   said first tubular member having a portion downstream of said supply means which defines a substantially continuously restricting flow passage;
   spray director means mounted on said first tubular member and having a flow passage therethrough having a portion downstream of the restricting flow passage of said first tubular member having divergent walls which terminate in an open end;
   a second tubular member mounted within said first tubular member and defining a flow passage therethrough which terminates within said first tubular member;
   means for supplying gas at an elevated pressure to said second tubular member whereby the gas mixes with the scrubbing liquid and the mixture is discharged through the open end of said spray director means into the flow of gas to be cleaned in a volume and at a velocity sufficient to clean the gas to be cleaned; and
   plate means having a plurality of orifices therethrough covering the flow passage through said second tubular member;
   the longitudinal axes of said orifices being substantially parallel with the longitudinal axis of the first tubular member.

2. The combination of claim 1 wherein said second tubular member is coaxially mounted within said first tubular member and extends into said first tubular member at least as far as said portion of said first tubular member which defines a substantially continuously restricting flow passage.

* * * * *